(12) United States Patent
Fischer (10) Patent No.: US 11,718,261 B2
(45) Date of Patent: Aug. 8, 2023

(54) VEHICLE PASSENGER PROTECTION SYSTEM COMPRISING AN AIRBAG MODULE

(71) Applicant: ZF AUTOMOTIVE GERMANY GMBH, Aldorf (DE)

(72) Inventor: Anton Fischer, Schechingen-Leinweiler (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/252,762

(22) PCT Filed: Jun. 19, 2019

(86) PCT No.: PCT/EP2019/066154
§ 371 (c)(1),
(2) Date: Dec. 16, 2020

(87) PCT Pub. No.: WO2019/243402
PCT Pub. Date: Dec. 26, 2019

(65) Prior Publication Data
US 2021/0253055 A1 Aug. 19, 2021

(30) Foreign Application Priority Data
Jun. 22, 2018 (DE) ...................... 10 2018 115 025.3

(51) Int. Cl.
*B60R 21/21* (2011.01)
*B60R 21/231* (2011.01)
(Continued)

(52) U.S. Cl.
CPC ............ *B60R 21/21* (2013.01); *B60R 21/233* (2013.01); *B60R 21/2338* (2013.01); *B60R 21/23138* (2013.01); *B60R 2021/23386* (2013.01)

(58) Field of Classification Search
CPC . B60R 21/21; B60R 21/23138; B60R 21/233; B60R 21/2338;
(Continued)

(56) References Cited

U.S. PATENT DOCUMENTS 5,722,685 A * 3/1998 Eyrainer ............... B60R 21/233
280/730.2
5,730,464 A 3/1998 Hill
(Continued)

FOREIGN PATENT DOCUMENTS

DE 19653796 6/1998
DE 19843111 3/2000
(Continued)

OTHER PUBLICATIONS

English machine-translation of WO 2019/020675 (Year: 2019).*

*Primary Examiner* — Paul N Dickson
*Assistant Examiner* — Tiffany L Webb
(74) *Attorney, Agent, or Firm* — Tarolli, Sundheim, Covell & Tummino L.L.P (57) ABSTRACT

A vehicle occupant protection system for a convertible includes an airbag disposed in the door. The airbag has a lower cell area, an upper cell area, and an intermediate area. The intermediate area, in a filled state of the airbag has a smaller thickness than the lower cell area and/or the upper cell area. A positioning strap has one end fastened to the vehicle at a fastening location, and a second end fastened to a fastening point at the intermediate area. A length of the positioning strap between the fastening location and the fastening point is configured to be shorter than a length of an airbag fabric between a lower edge of the airbag and the intermediate area of the airbag.

13 Claims, 4 Drawing Sheets

(51) Int. Cl.
  *B60R 21/233* (2006.01)
  *B60R 21/2338* (2011.01)
(58) Field of Classification Search
  CPC ...... B60R 2021/23386; B60R 21/2334; B60R 21/23316; B60R 2021/23308; B60R 2021/161
  See application file for complete search history.

(56) References Cited

U.S. PATENT DOCUMENTS

| | | | | |
|---|---|---|---|---|
| 5,868,421 | A * | 2/1999 | Eyrainer | B60R 21/21 280/730.2 |
| 5,984,348 | A * | 11/1999 | Specht | B60R 21/23138 280/730.1 |
| 6,508,486 | B1 * | 1/2003 | Welch | B60R 21/23138 280/730.2 |
| 7,581,751 | B2 * | 9/2009 | Ochiai | B60R 21/21 280/730.1 |
| 8,596,673 | B2 * | 12/2013 | Ruedisueli | B60R 21/2338 280/730.2 |
| 10,059,298 | B2 * | 8/2018 | Meissner | B60R 21/23138 |

FOREIGN PATENT DOCUMENTS

| | | |
|---|---|---|
| DE | 19930157 | 1/2001 |
| DE | 102005002705 | 7/2006 |
| JP | 2010214977 | 9/2010 |
| WO | 2019020675 | 1/2019 |

* cited by examiner

VEHICLE PASSENGER PROTECTION SYSTEM COMPRISING AN AIRBAG MODULE

RELATED APPLICATIONS

This application corresponds to PCT/EP2019/0066154, filed Jun. 19, 2019, which claims the benefit of German Application No. 10 2018 115 025.3, filed Jun. 27, 2018, the subject matter of which are incorporated herein by reference in their entirety.

BACKGROUND OF THE INVENTION

The invention relates to a vehicle occupant protection system comprising an airbag module disposed in the vehicle door of a vehicle in accordance with the preamble of claim 1.

Vehicle occupant protection systems comprising one or more airbag modules in general serve explicitly for protecting vehicle occupants in the case of accident. The airbags of the airbag modules prevent the vehicle occupants from impacting on the steering wheel or on controls and instruments and restrain the vehicle occupant.

Various types of such vehicle occupant protection systems are known from the state of the art. For example, in those vehicle occupant protection systems an airbag module is disposed on the steering wheel and/or in the instrument panel. Further airbags may be disposed in the area of a roof frame or, in the case of convertibles, in the A-pillar or in the door's armrest, for example.

The vehicle occupant protection systems can be designed so that, depending on the case of damage or a seat occupation which can be detected by sensors, only particular airbag modules are activated so that the airbags of the airbag modules are filled with gas and are inflated by a pyrotechnical generator, for example.

Especially in airbag modules the airbag of which is intended to restrict and/or decelerate a movement of a vehicle occupant transversely to the vehicle longitudinal direction, the airbag may happen to evade or "to bend to one side", when the vehicle occupant impacts on the airbag. This may happen, for instance, in the case of side airbags in convertibles which usually do not include any roof frame or any B-pillar. Such bending to one side can occur especially when the side window is in a lower position or was destroyed, and a side airbag disposed in the vehicle door thus cannot bear against the side window.

Therefore, airbags are known, for example, in which part of the main chamber is used for support on an outer side of a vehicle door. For example, DE 10 2005 050 574 A1 illustrates a side airbag module in which the airbag is subdivided by elongated incisions into plural interconnected portions and is folded such that, upon deployment, at least part of the portions come to lie on the outer side of the door.

It is the problem of the invention to provide a vehicle occupant protection system comprising an airbag module including an airbag, especially a side airbag module disposed in a vehicle door, the airbag of which shows improved protection against oscillation so that a risk of the airbag "bending to one side", when the vehicle occupant impacts on the airbag, can be prevented or at least minimized.

The features according to claim 1 result in the solution of the problem. Advantageous configurations are described in the subclaims.

SUMMARY OF THE INVENTION

A vehicle occupant protection system according to the invention includes an airbag module disposed in the vehicle door of the vehicle. In a preferred embodiment, the vehicle occupant protection system according to the invention is provided as a side airbag module in convertibles and/or coupes. In such embodiment, the side airbag module of the vehicle occupant protection system can be provided especially in lieu of a side airbag module otherwise disposed in the roof lining of a vehicle for protecting the head of the vehicle occupant.

The airbag module comprises at least one airbag and a gas generator for filling the airbag so that, in the damaging event and a situation of restraint resulting therefrom, the airbag can be filled with gas and inflated for protecting the vehicle occupant. The airbag of the airbag module comprises at least a lower cell area and an upper cell area.

In an activated and gas-filled state, the lower cell area of the airbag is disposed, in the vehicle vertical direction, substantially beneath the upper cell area. The lower edge of the airbag in the filled state of the airbag substantially corresponds to the lower edge of the lower cell area: The upper edge of the airbag in the filled state substantially corresponds to the upper edge of the upper cell area.

Between the lower cell area and the upper cell area, an intermediate area is arranged. In the filled state of the airbag, the intermediate area preferably has a smaller thickness than the lower cell area and/or the upper cell area. The thickness describes the expansion of the airbag in a vehicle transverse direction in a filled state of the airbag.

The intermediate area may be formed especially by connecting a front panel facing the vehicle occupant and a rear panel remote from the vehicle occupant of the outer shell/ panel of the airbag. The connection of the front panel to the rear panel of the airbag in the intermediate area can especially be made by sewing, weaving and/or gluing. In a typical embodiment, the front panel and the rear panel are not connected to each other over the entire length of the airbag in the intermediate area, and there is a fluid communication between the lower cell area and the upper cell area.

The airbag module of the vehicle occupant protection system according to the invention further comprises a positioning strap. One end of the positioning strap is fastened, in the state of the airbag module installed in the vehicle door, at a fastening location in a manner fixed to the vehicle. A second end of the positioning strap is fastened at a fastening point which is disposed in or at the intermediate area between the lower cell area and the upper cell area. The positioning strap can be attached especially by sewing. Further, the positioning strap can be fastened to the intermediate area by weaving or gluing. As an alternative, the afore-mentioned fastening techniques for fastening the positioning strap to the intermediate area may be combined.

The length of the positioning strap is shorter than the length of the airbag fabric between the lower edge of the airbag and the intermediate area, and especially shorter than the length of the airbag fabric of the lower cell area of the airbag between the lower edge of the airbag and the fastening point at the intermediate area. The length of the positioning strap especially constitutes the length of the positioning strap between the fastening location and the fastening point.

It can be achieved by the positioning strap that the airbag is forced to adopt a particular position in a filled state. Especially, during filling and deploying the airbag, a front and/or rear end of the airbag in the vehicle longitudinal direction can be moved or forced into a predetermined position by the positioning strap after activating the airbag module in a situation of restraint. In such predetermined position, the lower edge of the airbag is arranged, in the filled state beneath the door's armrest on a side of the vehicle door facing the vehicle interior. In this way, an additional support surface can be provided for the airbag of the vehicle occupant protection system at the vehicle door. In addition, the airbag can be pulled by the positioning strap in the direction of the vehicle interior toward the vehicle occupant. Especially, increased protection against oscillation of the airbag can be achieved in a situation of restraint in which a side window of the vehicle is in an opened or partially opened position or the side window was destroyed by the damaging event caused by the situation of restraint. Preferably, the protection for a vehicle occupant can thus be improved, in the case of lateral impact, even when the side window is opened or destroyed, as especially the airbag's "bending to one side" toward the vehicle outside can be prevented or at least minimized.

In typical embodiments, the positioning strap is disposed on the outside of the airbag. The positioning strap is especially provided to be disposed, in the deployed and filled state of the airbag, externally on a side of the airbag facing outboard of the vehicle, especially of the lower cell area of the airbag. Such externally disposed positioning strap can constitute an additional support member in a situation of restraint, when the vehicle occupant impacts on the airbag.

Moreover, there may also be provided a positioning strap which is arranged, in the deployed and filled state, externally on a side of the airbag facing the vehicle occupant, especially of the lower cell area of the airbag. Such arrangement may cause the airbag to be equally pulled downward during deployment. In addition, especially the upper cell area of the airbag can be pulled toward the vehicle occupant in the direction of the vehicle interior by a positioning strap disposed in this way.

In further embodiments, a vehicle occupant protection system according to the invention may include two or more positioning straps. Especially, in such embodiments, a positioning strap may be provided to be disposed on the airbag in the area of each of the front end and the rear end of the airbag, when viewed in the vehicle longitudinal direction. Each of the areas of the front and, resp., rear end describes an area of the airbag which is arranged, in the state deployed and installed in the vehicle door, in the vehicle longitudinal direction in front of or behind the airbag module housing.

The airbag module of the vehicle occupant protection system according to the invention is preferably arranged, in a state installed in the vehicle, in the area of the upper door edge. In particular, the airbag module is arranged on a side of the vehicle door facing the vehicle interior.

The vehicle-fixed fastening location for the positioning strap of the airbag module can especially be disposed in the vehicle door. Preferably, the fastening location in the vehicle door is disposed to be spaced apart from the airbag module housing of the airbag module. The spaced arrangement of the fastening location of the positioning strap helps provide, apart from the afore-mentioned advantages that can be achieved by the positioning strap, an additional connecting point for the entire airbag of the vehicle occupant protection system. Thus, preferably the stability and the rigidity of the airbag of the vehicle occupant protection system can be further increased and, consequently, the risk of the airbag "bending to the side" can be further reduced.

Preferably, it can further be achieved via the positioning straps that a deployment direction of the airbag is directed toward the vehicle interior. Thus, for example in a vehicle in the form of a coupe, it can be achieved that, in the deployed and filled state, the airbag is disposed in the area of the roof frame on the vehicle inside and hence, in the situation of restraint, can make use of the roof frame as support surface. Consequently, such configuration allows the same airbag module to be used in different car body designs.

Moreover, the airbag module of the vehicle occupant protection system may comprise a tether. Preferably, the tether is disposed externally on the side of the airbag facing the vehicle occupant. In a filled state of the airbag, the tether can completely span especially the lower cell area and the intermediate area and can at least partially span the upper cell area.

In a typical embodiment, one end of the tether is fastened to the vehicle at a tether fastening point. The second end is preferably fastened to the outer panel/shell of the airbag in the upper cell area. Especially, the second end of the tether can be fastened to an upper edge of the upper cell area of the airbag. Attachment of the second end of the tether to the airbag in the upper cell area can be effectuated especially by sewing, weaving and/or gluing the tether to the airbag fabric layer.

The tether fastening point is especially disposed on the vehicle door. In addition, one or more tether fastening points may coincide with a fastening location for a positioning strap and/or an airbag fastening point, with the airbag fastening point being preferably arranged in the area of the airbag module.

The tether is configured, in a flatly spread state, to be shorter than the flatly spread outer wall which is spanned by the tether, and to be shorter than the flatly spread outer wall portion of the airbag fabric spanned by the tether. In this way, the tether is tensioned, in the deployed and filled state of the airbag, over the lower cell area and the intermediate area of the airbag and pulls the upper cell area toward the vehicle occupant. Preferably, the tether may additionally help increase the stability and/or the rigidity of the airbag.

The positioning strap and/or the tether further may comprise a friction layer and/or a friction coating on a side facing the airbag. Especially in the case of the tether, due to the space forming between the tether and the intermediate area, the tether may yield, upon the vehicle occupant' impact, in the direction of the intermediate area and may generate heat and thus absorb energy due to the friction layer/the friction coating of the tether.

Both in the lower cell area and in the upper cell area, X tether elements and/or anchoring straps inserted by sewing can be integrated for shaping the cross-section. In addition, the rear and front panels of the airbag may be connected, especially sewn, woven or glued, to each other at additional locations or areas apart from the outer edges and the intermediate area.

The airbag, especially the airbag fabric layers, the positioning strap and the tether may be made from an airbag fabric known per se, for example. The airbag fabric layers forming the airbag further can include a coating known to the skilled person from the state of the art or the like so that the airbag can reach a sufficient service life.

BRIEF DESCRIPTION OF THE DRAWINGS

Further advantages, features and details of the invention will result from the following description of preferred embodiments as well as on the basis of the drawings, wherein.

DESCRIPTION

Figure 1:
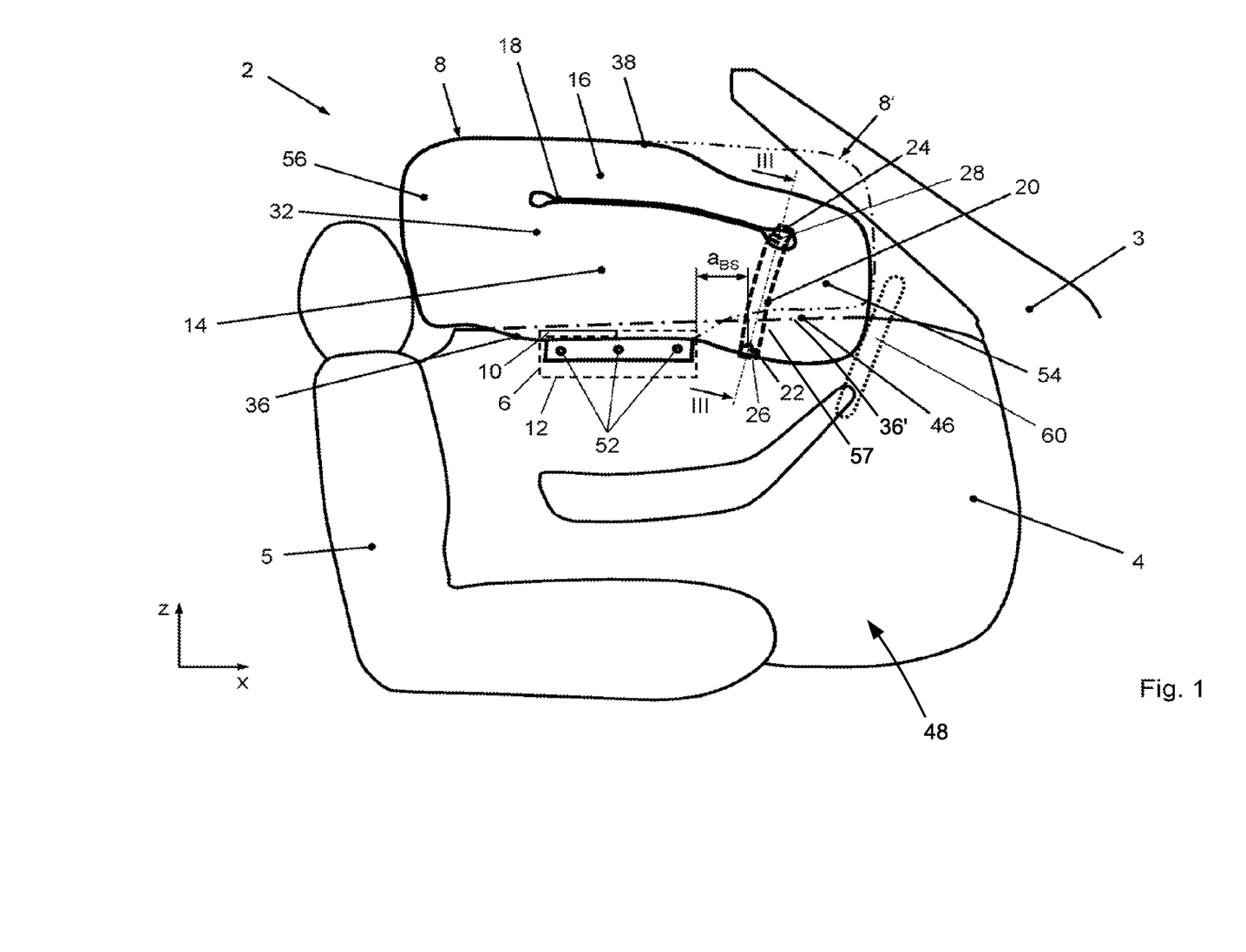
FIG. 1 shows a schematic side view from a vehicle inside to a vehicle occupant protection system according to the invention comprising a side airbag module in an activated state.

FIG. 1 illustrates a first embodiment of a vehicle occupant protection system 2 according to the invention in a vehicle 3 in the form of a convertible. The vehicle occupant protection system 2 comprises an airbag module 6 (shown in broken lines) that is arranged in a vehicle door 4 on a driver side of the vehicle 3. The airbag 8 of the airbag module 6 of the vehicle occupant protection system 2 in the illustrated embodiment is in the form of a side airbag 8 that extends, in the deployed and filled state, in the vehicle longitudinal direction approximately from a steering wheel 60 to a vehicle seat 5.

The airbag module 6 is arranged in the area of an upper door edge 46 in the vehicle door 4. The airbag 8 is fastened within or at the vehicle door 4 of the vehicle 3 in a manner fixed to the vehicle in the area of a lower edge 36 of the airbag 8 to airbag fastening points 52 which are disposed in or in the area of the airbag module 6.

Figure 2:
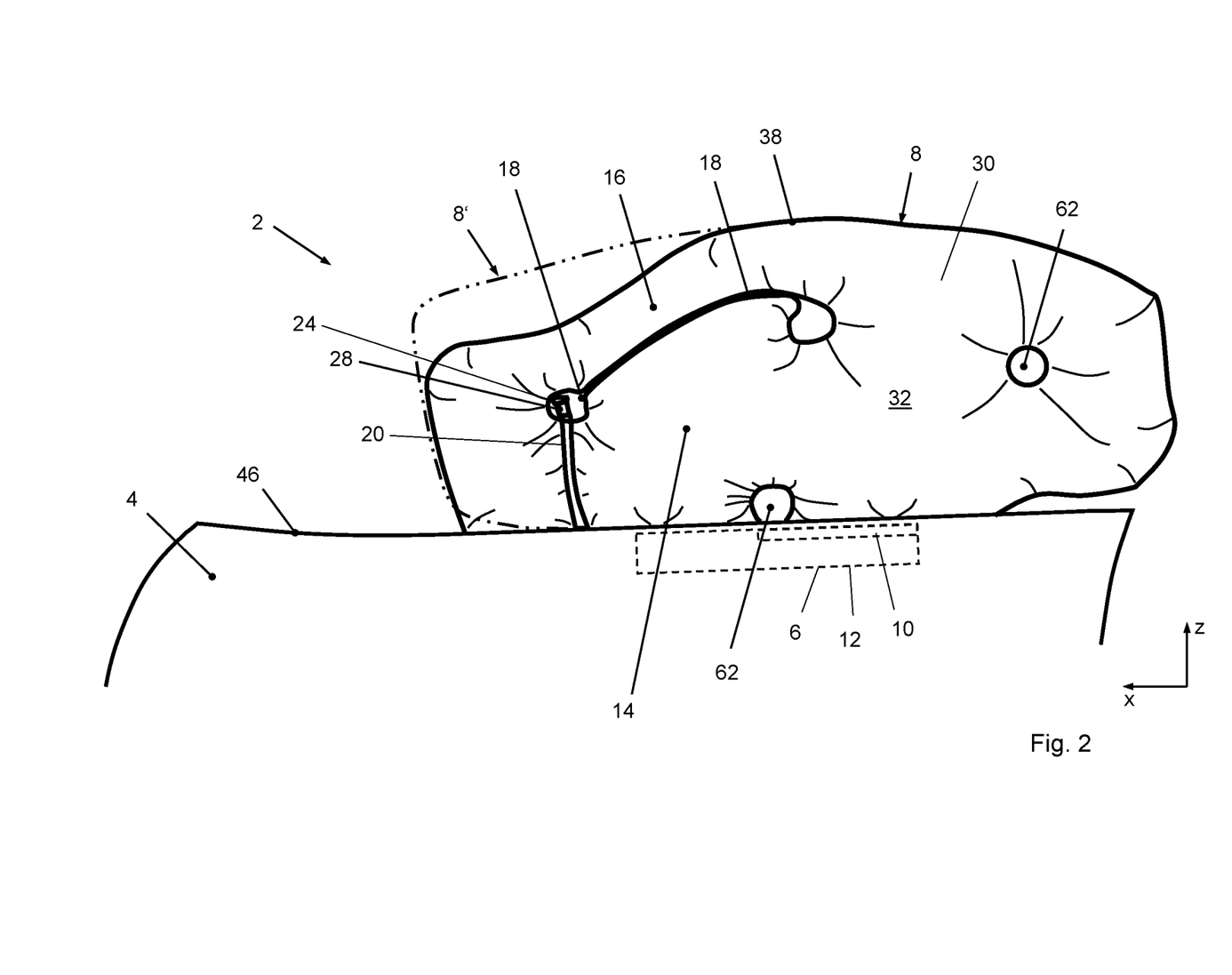
FIG. 2 shows a schematic side view from a vehicle outside to the vehicle occupant protection system according to the invention comprising the side airbag module in an activated state.

FIG. 2 illustrates the area of the upper door edge 46 of the vehicle door 4 with the deployed and filled side airbag 8 of the vehicle occupant protection system 2. The broken line shows the position of the airbag module 6 or of the airbag module housing 12 as well as of the gas generator 10 in the vehicle door 4.

The airbag 8 comprises a lower cell area 14 and an upper cell area 16. The lower cell area 14 is delimited against the upper cell area 16 by an intermediate area 18. The lower cell area 14 extends, relating to a vehicle vertical axis z, from the lower edge 36 of the airbag 8 to the intermediate area 18. The upper cell area 16 extends, relating to the vehicle vertical axis z, adjoining the same from the intermediate area 18 to an upper edge 38 of the airbag 8.

The intermediate area 18 constitutes an area in which a front panel 32 and a rear panel 34 of the airbag 8 are connected to each other. The front panel 32 is the inner panel of the airbag 8 which, in the deployed and inflated state of the airbag 8, faces the vehicle interior 48, and thus is the side of the airbag 8 facing the vehicle occupant. The rear panel 34 consequently is the outer panel of the airbag 8 remote from the vehicle occupant in the deployed and inflated state of the airbag 8.

FIG. 2 moreover illustrates further connecting areas 62 in which the front panel 32 and the rear panel 34 of the airbag 8 are connected, especially sewn or woven, to each other.

The vehicle occupant protection system 2 further comprises a positioning strap 20. As is visible especially from FIGS. 2 and 3, the positioning strap 20 is disposed externally on the rear panel 34 of the airbag 8 remote from the vehicle occupant. A first end 22 of the positioning strap 20 is fastened to a fastening location 26 at the vehicle door 4 in a manner fixed to the vehicle. A second end 24 of the positioning strap 20 is fastened to a fastening point 28. The fastening point 28 is preferably disposed at the intermediate area 18.

The fastening location 26 for the positioning strap is disposed, in the shown embodiment in FIG. 1, in the vehicle door 4 spaced apart from the airbag module 6, especially from the airbag module housing 12, by a distance $a_{BS}$. In order to fasten the positioning strap 20 to the fastening location 26, the positioning strap may protrude from the airbag module housing 12 in a mounting state of the airbag module such that, when mounting the airbag module 6 on/in the vehicle door, it can be fastened to the fastening location 26.

As is evident from FIGS. 1 and 2, the airbag 8 is pulled downward in the vehicle vertical direction z by the positioning strap 20 in the deployed and filled state in the area of a front end 54 in the vehicle longitudinal direction x.

Especially, the positioning strap 20 is capable of influencing the positioning of the airbag 8 during deployment and in the subsequent deployed and filled state so that a lower edge of the airbag 8 is pulled in the direction of the vehicle interior 48. Thus, the lower edge 36 of the airbag 8 is especially enabled to be disposed, in the deployed and filled state, in the area of the positioning strap beneath the upper door edge 46 of the vehicle door 4, thereby creating especially an additional support surface 57 for the airbag 8 in a situation of restraint. The additional support surface 57 can at least reduce the risk of the airbag 8 "bending away" to the outside when the vehicle occupant 50 impacts on the airbag.

In FIGS. 1 and 2, the outer contour of an airbag 8' is shown by the dash-dot-dot line. The airbag 8 would adopt said contour without the positioning strap 20 in the deployed, filled, and inflated state. As is especially evident from FIG. 1, the lower edge 36' of the airbag 8' where no positioning strap is disposed is arranged above the upper door edge 46 of the vehicle door 4.

Figure 4:
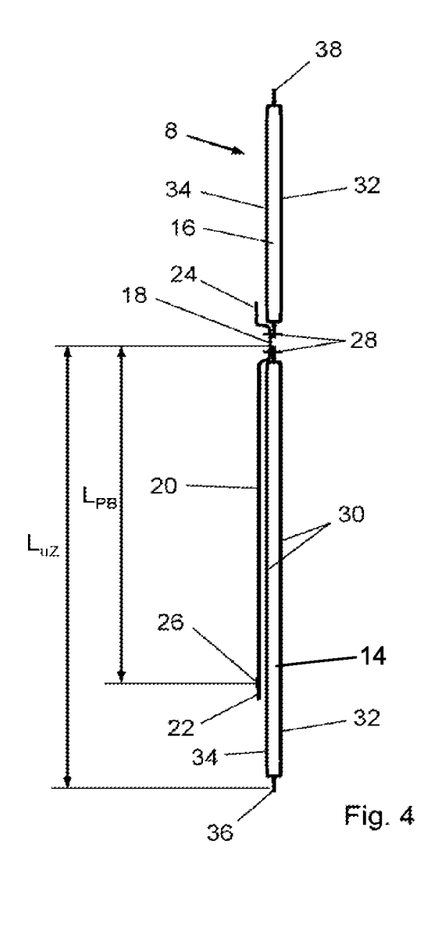
FIG. 4 shows a schematic sectional view across the non-filled and flatly spread side airbag of the vehicle occupant protection system according to the line III-III in FIG. 1.

The influence on the positioning of the airbag 8 by the positioning strap 20 can especially be achieved by the fact that a length $L_{PB}$ of the positioning strap 20 is shorter than a length $L_{uZ}$ of the airbag fabric 30, especially in a flatly spread state of the airbag 8, cf. FIG. 4. The length $L_{PB}$ of the positioning strap especially helps describe the length of the positioning strap 20 from the fastening location 28 to the fastening point. The length $L_{uZ}$ of the airbag fabric 30 especially describes the length of the airbag fabric 30 of the lower cell area 14 from the lower edge 36 of the airbag 8 to the fastening point 28 that is disposed at/in the intermediate area 18 of the airbag 8.

Figure 3:
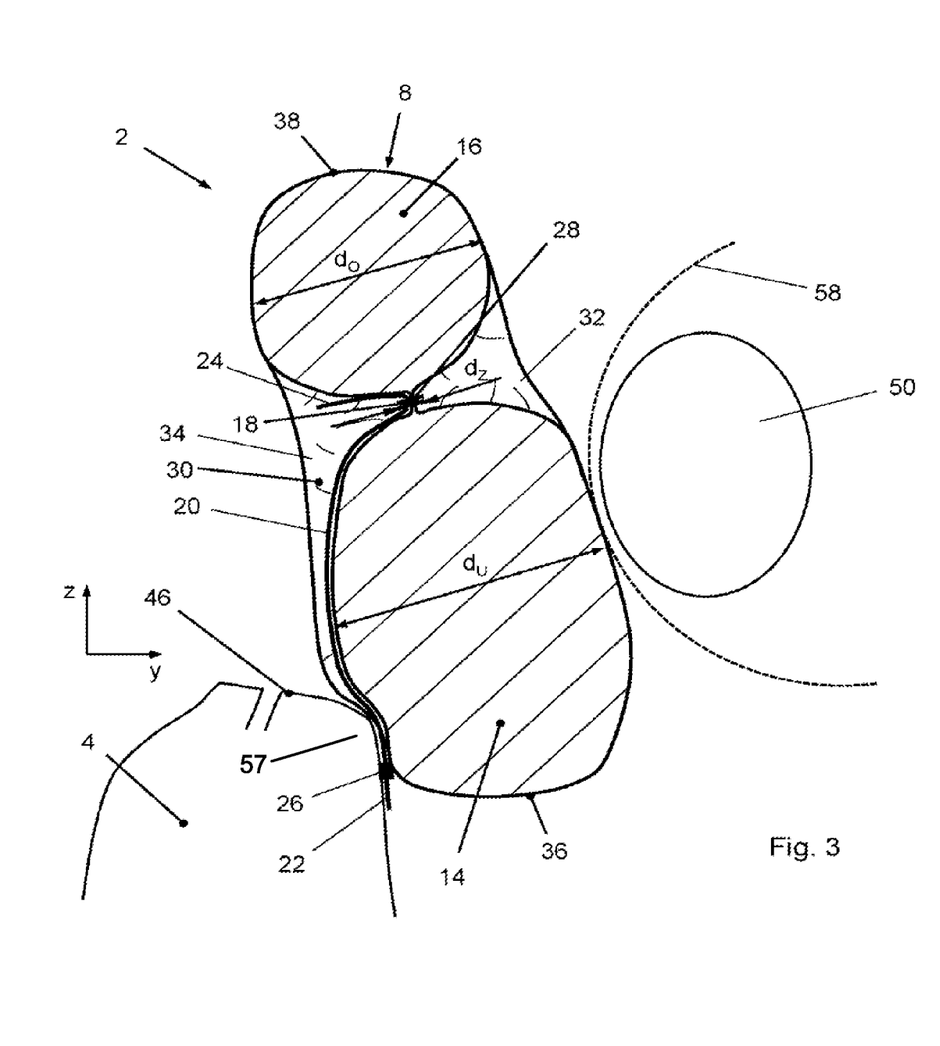
FIG. 3 shows a schematic sectional view across the vehicle occupant protection system according to the line III-III in FIG. 1.

FIG. 3 illustrates a sectional view according to the line II in FIG. 1 across the deployed and filled airbag 8 in the area of the positioning strap 20 and an upper door edge 46 of the vehicle door 4. In addition, FIG. 3 illustrates the head of a vehicle occupant 50 just before the head of the vehicle occupant 50 impacts on the airbag 8 in a situation of restraint. Furthermore, the dotted line shows part of an outer contour of a driver airbag 58 usually disposed in a steering wheel 60 (see FIGS. 1 and 5).

When the vehicle occupant 50 impacts on the airbag 8 in the situation of restraint, the positioning strap serves as an additional support member that is at least capable of reducing the risk of the airbag 8 "bending to one side" out of the vehicle.

It is visible from FIG. 3 that especially the lower cell area 14 of the airbag 8 is pulled downward in the vehicle vertical direction z by the positioning strap 20 and in the vehicle transverse direction y toward the vehicle interior 48.

FIG. 3 further illustrates that, in the deployed and filled state, the airbag 8 in the intermediate area 18 has a thickness $d_Z$ that is less or smaller than a thickness du of the lower cell area 14 and a thickness do of the upper cell area 16. The thickness $d_Z$ of the intermediate area 18, the thickness du of the lower cell area 14 and the thickness do of the upper cell area 16 substantially correspond to the expansion of the airbag 8 in the respective portion in a vehicle transverse direction y.

Figure 5:
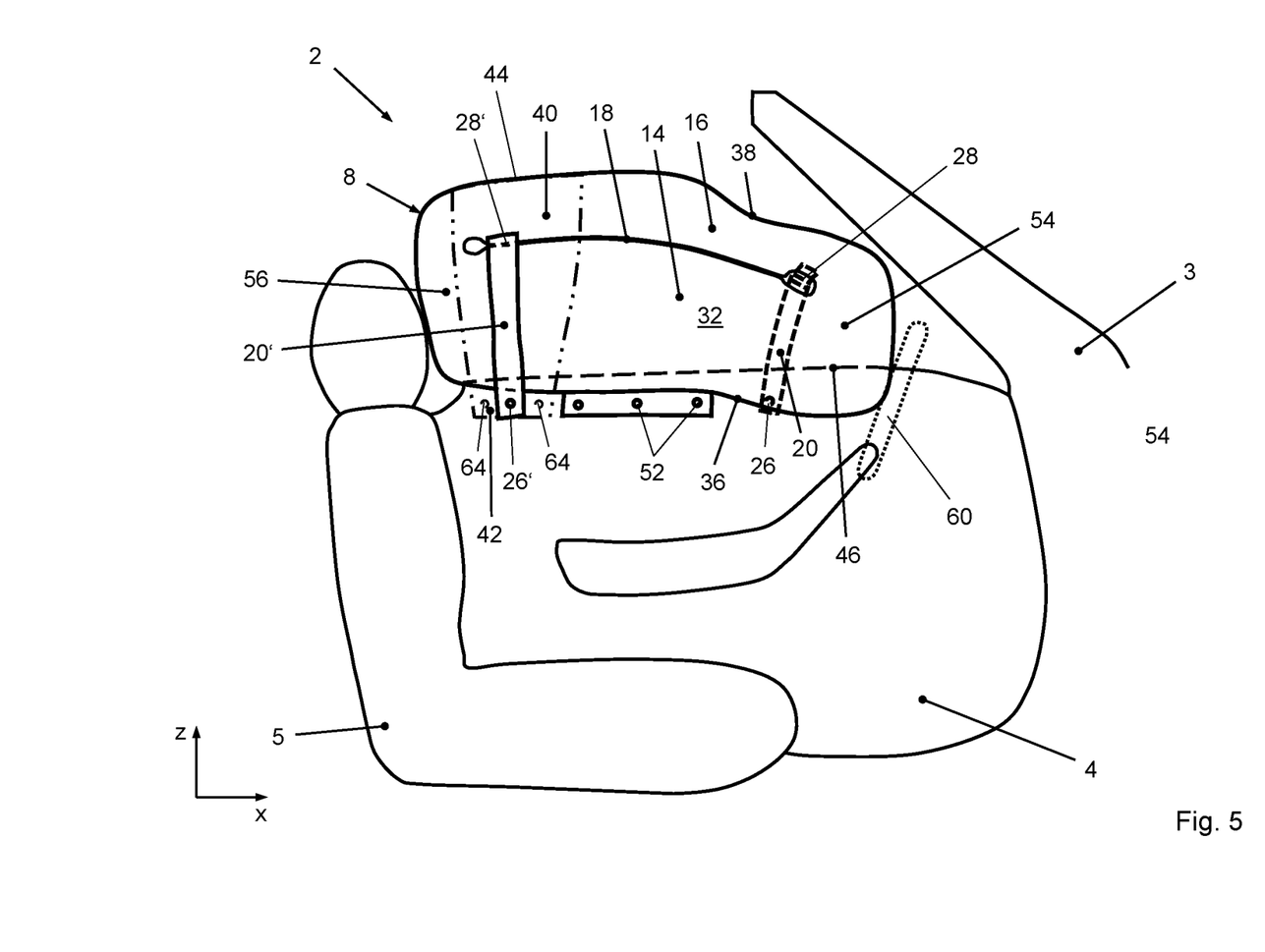
FIG. 5 shows a schematic sectional view from a vehicle inside to another embodiment of a vehicle occupant protection system according to the invention comprising a side airbag module.

In FIG. 5, another embodiment of a vehicle occupant protection system 2 according to the invention is shown, wherein hereinafter merely the differences from the preceding figures shall be discussed in detail.

On the airbag 8 according to FIG. 5, apart from the positioning strap 20 that is disposed in the area of the front end 54 of the airbag 8 externally on the side remote from the vehicle occupant, a second positioning strap 20' is disposed in the area of a rear end 56 of the airbag 8. A first end of the positioning strap 20 is fastened to a fastening location 26' at the vehicle door 4 in a manner fixed to the vehicle. A second end of the positioning strap 20 is fastened to a fastening point 28'. In the shown embodiment, the second positioning band 20' disposed in the area of the rear end 56 is disposed externally on the side facing the vehicle occupant.

Alternatively, the second positioning strap 20' can equally be disposed externally on the side of the airbag 8 remote from the vehicle occupant (not shown).

By arranging the positioning strap 20' on the side of the airbag 8 facing the vehicle occupant, during deployment the airbag 8 can equally be pulled downward or toward the vehicle interior 48 with a lower edge 36 so that in a vehicle vertical direction z the latter is equally disposed beneath the upper door edge 46 of the vehicle door 4. In addition, a positioning strap 20' disposed on the side facing the vehicle occupant can help pull also the upper cell area 16 of the airbag 8 in the direction of the vehicle interior 48 toward the vehicle occupant 50 so that, in a situation of restraint, the distance between the vehicle occupant 50 and the front panel of the airbag 8 can be reduced and preferably a movement of the vehicle occupant can be restricted earlier.

Moreover, the dash-dot-dot line in FIG. 5 illustrates a tether 40 which may also be provided in a vehicle occupant protection system 2.

The tether 40 is disposed externally on a side of the airbag 8 facing the vehicle occupant. In the shown embodiment, the tether 40 spans, in the deployed and inflated state of the airbag 8, the lower cell area 14, the intermediate area 18 and the upper cell area 16. The tether 40 is fastened by a first end 42 to tether fastening points 64 in a manner fixed to the vehicle. The second end 44 of the tether 40 is fastened to the upper edge 38 of the airbag 8 in the upper cell area 16.

As an alternative (not shown), the tether 40 can span the upper cell area 16 only partially and can be fastened to the front panel 32 in the area of the upper cell area 16, or the tether 40 can span the upper cell area 16 and the upper edge 38 and can be fastened in the area of the rear panel 34 of the upper cell area 16 of the airbag 8 (not shown, either).

The tether 40 helps pull or curve especially the upper cell area 16 of the airbag 8 in the direction of the vehicle interior 48. Thus, in a situation of restraint, for example the distance between the vehicle occupant 50 and the airbag 8 can be reduced and preferably a movement of the vehicle occupant 50 can be restricted earlier.

The positioning strap 20, 20' and especially the tether 40 may additionally include a friction layer and/or a friction coating on a side facing the airbag fabric 30 of the airbag 8. The friction layer and/or a friction coating can be used for absorbing the energy present in the situation of restraint, especially when the vehicle occupant 50 impacts on the tether 40 and the airbag 8, by the friction heat occurring between the tether 40 and the front panel 32 of the airbag 8.

The invention claimed is:

1. A vehicle occupant protection system, comprising an airbag module disposed in a vehicle door of a vehicle which comprises at least one gas generator and one airbag, the airbag having a lower cell area and an upper cell area, with an intermediate area being arranged between the lower cell area and the upper cell area, wherein the intermediate area in an activated and filled state of the airbag has a smaller thickness than the lower cell area and/or the upper cell area, wherein a positioning strap has one end of fastened to a fastening location on the vehicle, and a second end fastened to a fastening point at the intermediate area, wherein a length of the positioning strap between the vehicle-fixed fastening location and the fastening point at the intermediate area is configured to be shorter than a length of an airbag fabric between a lower edge of the airbag and the intermediate area of the airbag.

2. The vehicle occupant protection system according to claim 1, wherein the positioning strap is disposed externally on a side of the airbag facing outboard of the vehicle.

3. The vehicle occupant protection system according to claim 1, wherein the positioning strap is disposed externally on a side of the airbag facing the vehicle occupant.

4. The vehicle occupant protection system according to claim 1, wherein the fastening location for the positioning strap is disposed in the vehicle door spaced apart from an airbag module housing.

5. The vehicle occupant protection system according to claim 1, further comprising a tether disposed externally on a side of the airbag facing the vehicle occupant.

6. The vehicle occupant protection system according to claim 5, wherein the tether, in an activated and filled state of the airbag, completely spans the lower cell area and the intermediate area of the airbag and at least partially spans the upper cell area.

7. The vehicle occupant protection system according to claim 6, wherein the tether and/or the positioning strap include a friction layer on a side facing the lower cell area and/or the upper cell area of the airbag.

8. The vehicle occupant protection system according to claim 6, wherein the tether and/or the positioning strap include a friction coating on a side facing the lower cell area and/or the upper cell area of the airbag.

9. The vehicle occupant protection system according to claim 5, wherein one end of the tether is fixed to the vehicle and a second end of the tether is fastened to the upper cell area, especially to an upper edge of the upper cell area.

10. The vehicle occupant protection system according to claim 1, wherein the airbag module installed in the vehicle door in an area of an upper door edge on a side facing a vehicle interior.

11. The vehicle occupant protection system according to claim 1, wherein the airbag comprises a front panel and a rear panel that are connected to each other at connecting areas, wherein the fastening point at the intermediate area comprises one of the connecting areas.

12. The vehicle occupant protection system according to claim 1, wherein the length of the positioning strap is configured so that the positioning strap pulls the lower cell area inboard in response to inflation of the airbag.

13. The vehicle occupant protection system according to claim 1, wherein the vehicle is a convertible vehicle.

\* \* \* \* \*